(12) United States Patent
Tanabe

(10) Patent No.: US 7,854,453 B2
(45) Date of Patent: Dec. 21, 2010

(54) SYSTEM FOR DETECTING OBJECTS COLLIDING WITH AUTOMOTIVE VEHICLE

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 802 days.

(21) Appl. No.: 11/732,685

(22) Filed: Apr. 4, 2007

(65) Prior Publication Data

US 2007/0273166 A1  Nov. 29, 2007

(30) Foreign Application Priority Data

May 26, 2006 (JP) ............................. 2006-146351

(51) Int. Cl.
*B60R 19/24* (2006.01)
(52) U.S. Cl. ...................... 293/102; 293/154; 340/436; 296/187.04
(58) Field of Classification Search ................. 293/102, 293/117, 154; 73/774; 340/436; 180/274; 280/728.1; 296/187.04, 187.09
See application file for complete search history.

(56) References Cited

U.S. PATENT DOCUMENTS

| | | | |
|---|---|---|---|
| D493,596 S | 7/2004 | Mori | |
| 7,104,354 B2 | 9/2006 | Ozaki | |
| 7,293,809 B2* | 11/2007 | Suzuki et al. ................ | 293/117 |
| 7,416,231 B2* | 8/2008 | Takahashi et al. ........... | 293/102 |
| 7,497,491 B2* | 3/2009 | Zanella et al. .............. | 293/102 |
| 2004/0059487 A1* | 3/2004 | Lich et al. ...................... | 701/45 |
| 2005/0021192 A1* | 1/2005 | Takafuji et al. ................ | 701/1 |
| 2005/0116817 A1 | 6/2005 | Mattes et al. | |
| 2005/0154530 A1* | 7/2005 | Hosokawa et al. .......... | 701/301 |
| 2006/0064220 A1* | 3/2006 | Murakami et al. ............ | 701/45 |
| 2006/0087132 A1 | 4/2006 | Tanabe | |
| 2006/0224289 A1* | 10/2006 | Kiribayashi et al. ........... | 701/45 |
| 2006/0231321 A1* | 10/2006 | Takahashi ..................... | 180/274 |
| 2007/0046044 A1 | 3/2007 | Tanabe | |
| 2007/0114803 A1* | 5/2007 | Takahashi et al. ........... | 293/102 |
| 2009/0050395 A1* | 2/2009 | Hosokawa et al. .......... | 180/274 |

FOREIGN PATENT DOCUMENTS

DE   100 30 360   1/2002

(Continued)

OTHER PUBLICATIONS

Office action dated Mar. 10, 2008 in German Application No. 10 2007 015 734.9 with English translation thereof.

*Primary Examiner*—Jason S Morrow
(74) *Attorney, Agent, or Firm*—Harness, Dickey & Pierce, PLC

(57) ABSTRACT

A system for detecting objects colliding with an automotive vehicle includes a bumper-reinforcing member disposed behind a front bumper, a supporting member disposed behind the bumper-reinforcing member, forming a small gap therebetween, and a load sensor disposed between the bumper-reinforcing member and the supporting member in an overlapped manner. A load caused by a collision and detected by the load sensor is fed to an electronic controller that determines whether the object colliding with the vehicle is a pedestrian or other objects. Since the load sensor is mounted in a manner overlapping with the bumper-reinforcing member and the supporting member, an increase in a longitudinal length of a bumper structure by installing the load sensor is minimized. The load sensor may include plural detecting plates, each having a strain gage mounted thereon.

12 Claims, 8 Drawing Sheets

FOREIGN PATENT DOCUMENTS

| | | |
|---|---|---|
| DE | 102 17 031 | 10/2003 |
| DE | 102 59 527 | 7/2004 |
| DE | 103 31 862 | 2/2005 |
| DE | 10 2007 019 054 | 11/2007 |
| JP | 05-139241 | 6/1993 |

* cited by examiner

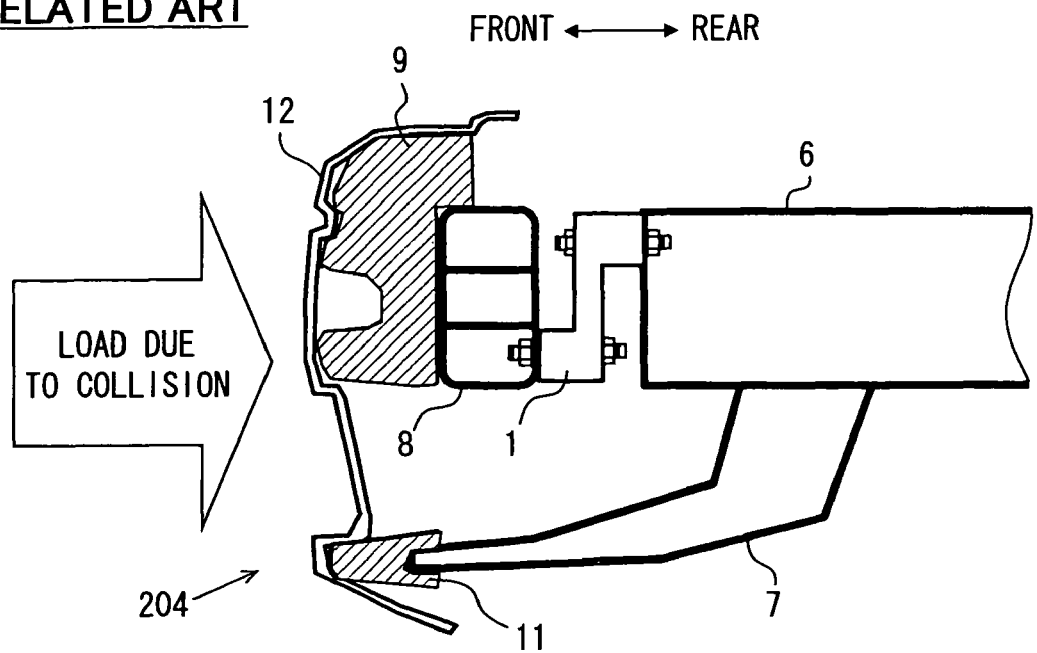
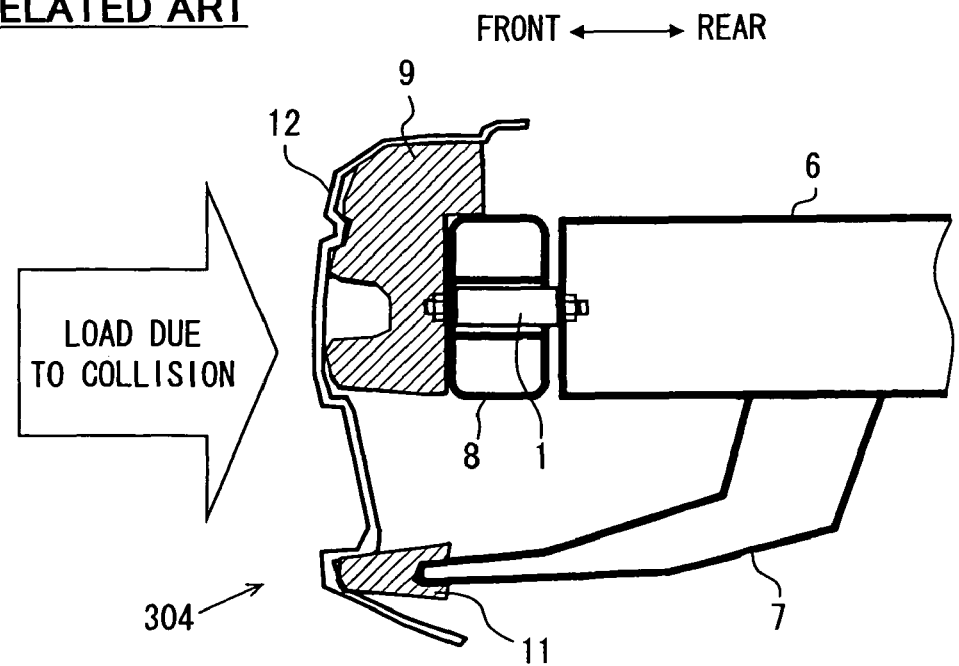

SYSTEM FOR DETECTING OBJECTS COLLIDING WITH AUTOMOTIVE VEHICLE

CROSS-REFERENCE TO RELATED APPLICATION

This application is based upon and claims benefit of priority of Japanese Patent Application No. 2006-146351 filed on May 26, 2006, the content of which is incorporated herein by reference.

BACKGROUND OF THE INVENTION

1. Field of the Invention

The present invention relates to a system for detecting kinds of objects colliding with an automotive vehicle, and more particularly to a detector for finding whether the vehicle collides with a pedestrian.

2. Description of Related Art

There have been various proposals as to a system for finding whether an automotive vehicle collides with a pedestrian or other objects. For example, JP-A-2006-118982 proposes a system in which a load sensor for detecting a collision load is disposed between a bumper-reinforcing member and a supporting member positioned at a rear side of the bumper. In this system, however, there is a problem that a certain space for installing the load sensor has to be provided between the bumper-reinforcing member and the supporting member. This means that a thickness of an absorber or the bumper-reinforcing member has to be reduced, adversely affecting a bumper function.

SUMMARY OF THE INVENTION

The present invention has been made in view of the above-mentioned problem, and an object of the present invention is to provide an improved collision detecting system, in which a space required for installing a load sensor is minimized.

The system for detecting objects colliding with a vehicle is composed of a bumper absorber, a bumper-reinforcing member, a load sensor and an electronic controller. A load caused by a collision with an object is transferred from a front bumper to the load sensor connected to the bumper-reinforcing member and the supporting member in an overlapped manner. Whether the object colliding with the vehicle is a pedestrian or other objects is determined by the electronic controller based on signals generated in the load sensor.

The supporting member elongated in a front to rear direction of the vehicle is positioned behind the bumper-reinforcing member, forming a small gap between the bumper-reinforcing member and the supporting member. The small gap (e.g., about 3 mm) allows a backward stroke of the front bumper when a collision occurs. The load sensor is composed of a mounting plate connected to the bumper reinforcing member, detecting plates, and strain gages mounted on the detecting plates. The detecting plates are connected to the supporting member.

Since the load sensor is connected to both of the bumper-reinforcing member and the supporting member in an overlapping manner, a longitudinal length of the bumper structure is increased only by a very small amount, e.g., 5 mm by installing the load sensor. The load caused by a collision is surely transferred to the load sensor, and kinds of objects colliding with the vehicle are detected by the electronic controller based on the collision load detected by the load sensor.

The load sensor may be variously designed. For example, the mounting plate may be connected to the supporting member, and detecting plates may be connected to the bumper-reinforcing member. The mounting plate maybe eliminated, and the load sensor may be formed only by a pair of detecting plates on which the strain gages are mounted. In this case, the bumper-reinforcing member and the supporting member are connected by the detecting plates, forming a small gap between the bumper-reinforcing member and the supporting member.

According to the present invention, an increase in the longitudinal length of the bumper structure by installing the load sensor is minimized without adversely affecting the rigidity of the bumper structure. Other objects and features of the present invention will become more readily apparent from a better understanding of the preferred embodiments described below with reference to the following drawings.

BRIEF DESCRIPTION OF THE DRAWINGS

FIG. 7 is a cross-sectional view showing a comparative example 2 of the mounting structure;

FIG. 8 is a cross-sectional view showing a comparative example 3 of the mounting structure;

DETAILED DESCRIPTION OF THE PREFERRED EMBODIMENTS

Figure 1:
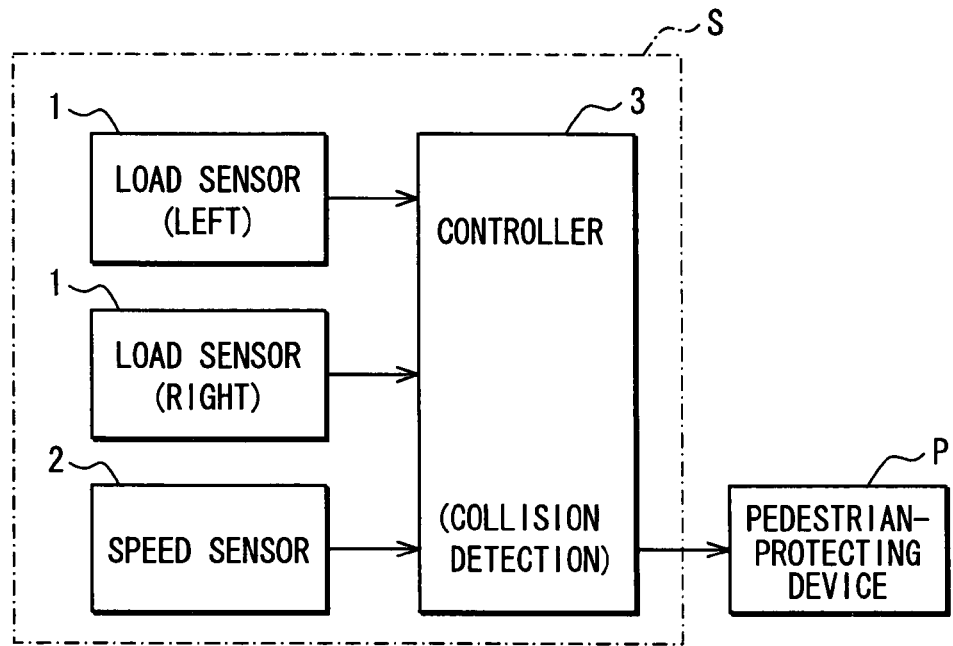
FIG. 1 is a block diagram showing an entire system for detecting objects colliding with an automotive vehicle.

A first embodiment of the present invention will be described with reference to FIGS. 1-9. FIG. 1 shows an entire structure of a system S for detecting objects colliding with an automotive vehicle. The system S includes a pair of load sensors 1 for detecting a load imposed on the vehicle, a speed sensor 2 for detecting driving speed of the vehicle, and a controller 3. The controller 3 that includes a microcomputer detects kinds of objects colliding with the vehicle based on signals from the load sensors 1 and the speed sensor 2. The controller 3 operates a pedestrian-protecting device P such as an airbag or a device for popping up a hood when it is determined that a colliding object is a pedestrian.

Figure 2:
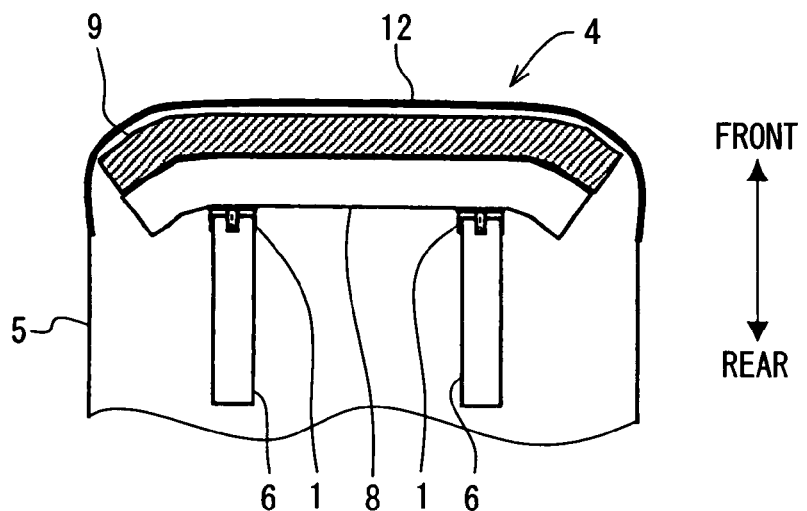
FIG. 2 is a schematic view showing a vicinity of a load sensor positioned behind a bumper-reinforcing member.
Figure 3:
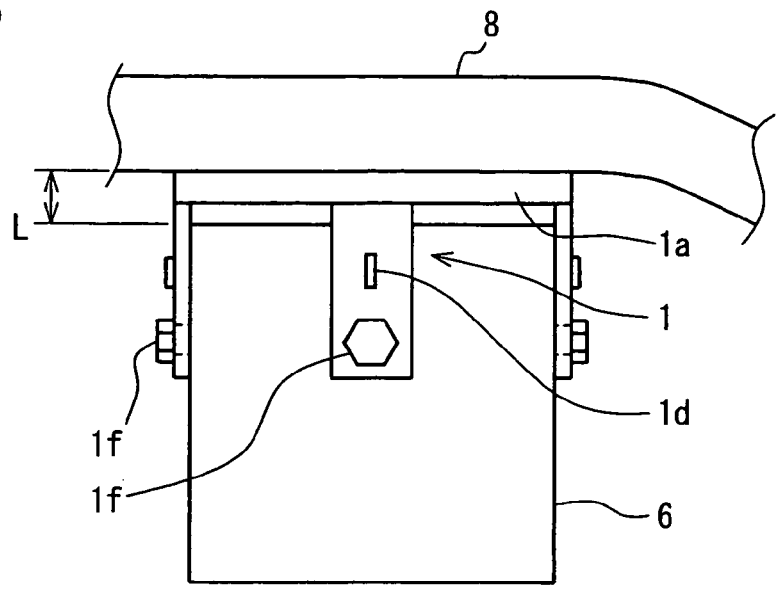
FIG. 3 is a schematic view showing the load sensor in an enlarged scale, as a first embodiment of the present invention.
Figure 5:
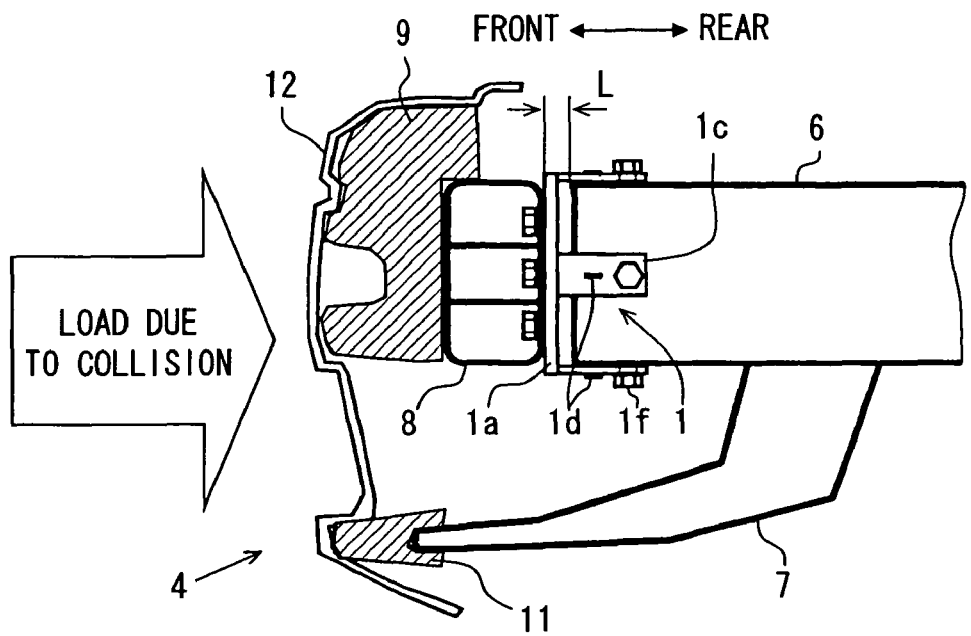
FIG. 5 is a cross-sectional view showing a mounting structure of the load sensor.

As shown in FIG. 2, a front bumper 4 includes an upper bumper absorber 9, a bumper-reinforcing member 8 positioned behind the bumper absorber 9 and a bumper cover 12 covering the outside of the bumper. A pair of supporting members 6 is positioned behind the bumper-reinforcing member 8 and extends in a direction from the front side to the rear side. As shown in FIGS. 3 and 5, the supporting member 6 is positioned behind the bumper-reinforcing member 8 with a small gap L apart therefrom. The load sensor 1 composed of such as a strain gage for detecting a load caused by a collision is installed at a front end of each supporting member 6.

Figure 4A:
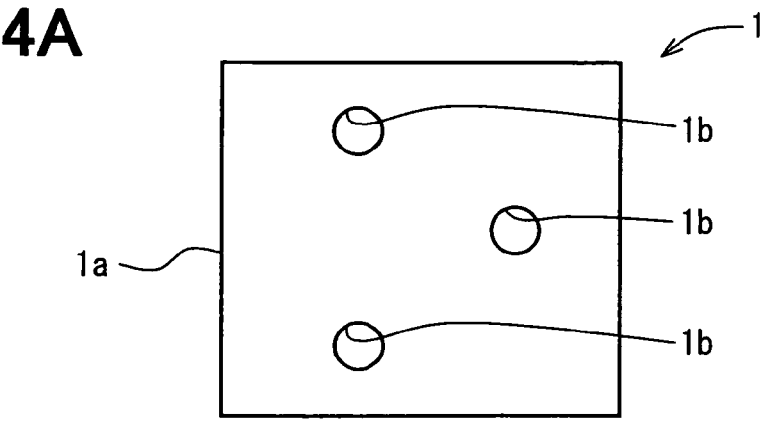
FIG. 4A is a front view showing a mounting plate of the load sensor.
Figure 4B:
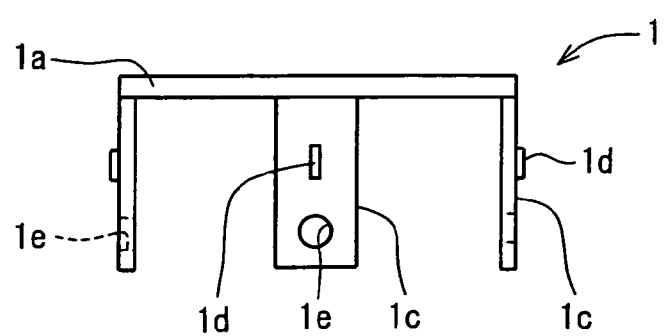
FIG. 4B is a top view showing the load sensor.

As shown in FIG. 4, the load sensor 1 is composed of a square mounting plate 1a made of a metallic material, four detecting plates 1c made of a metallic material extending to the rear side from the mounting plate 1a, and four strain gages 1d, each mounted on each detecting plate 1c. The mounting plate 1a has three mounting holes 1b. As shown in FIG. 3, the mounting plate 1a is connected to the rear surface of the bumper-reinforcing member 8 by three mounting bolts (not shown) inserted into the mounting holes 1b of the mounting plate 1a. The load sensor 1 is connected to the supporting member 6 by four mounting bolts 1f, each inserted into each mounting hole 1e formed in the detecting plate 1c. The supporting member 6 has four side surfaces (or walls), i.e., upper, lower, left and right surfaces. The load sensor 1 is connected to each of the four surfaces of the supporting member 6.

As shown in FIG. 3, the front end of the supporting member 6 is positioned behind the bumper-reinforcing member 8 with a small gap L apart from the rear end of the bumper-reinforcing member 8. The gap L is set to about 5 mm, for example, and the thickness of the mounting plate 1a is about 2 mm. Accordingly, there is a space of about 3 mm between the mounting plate 1a and the front end of the supporting plate 6. The 3 mm space is sufficient for a backward stroke of the load sensor 1 upon a collision.

As shown in FIG. 5, the bumper 4 includes two shock absorbers, an upper bumper absorber 9 and a lower bumper absorber 11, both covered by a bumper cover 12. The bumper-reinforcing member 8, which has hollow spaces separated by two inside beams, is positioned behind the upper bumper absorber 9 in contact therewith. Both of the absorbers 9, 11 are made of a material that absorbs collision shock, such as foamed plastics. The lower bumper absorber 11 is supported by a bracket 7 connected to the supporting member 6.

The controller 3 determines whether a colliing object is a pedestrian (a person) or an object other than a pedestrian based on signals fed from the load sensors 1 and the speed sensor 2. The collision loads detected by the two load sensors 1 are added, and the added loads are divided by a driving speed to obtain a mass or weight colliding with the vehicle. Determination as to whether the colliding object is a pedestrian or not may be made referring to a stored map showing a relation between the colliding mass and kinds of objects. When it is determined that the collided object is a pedestrian, the pedestrian protecting device P is operated.

Figure 6:
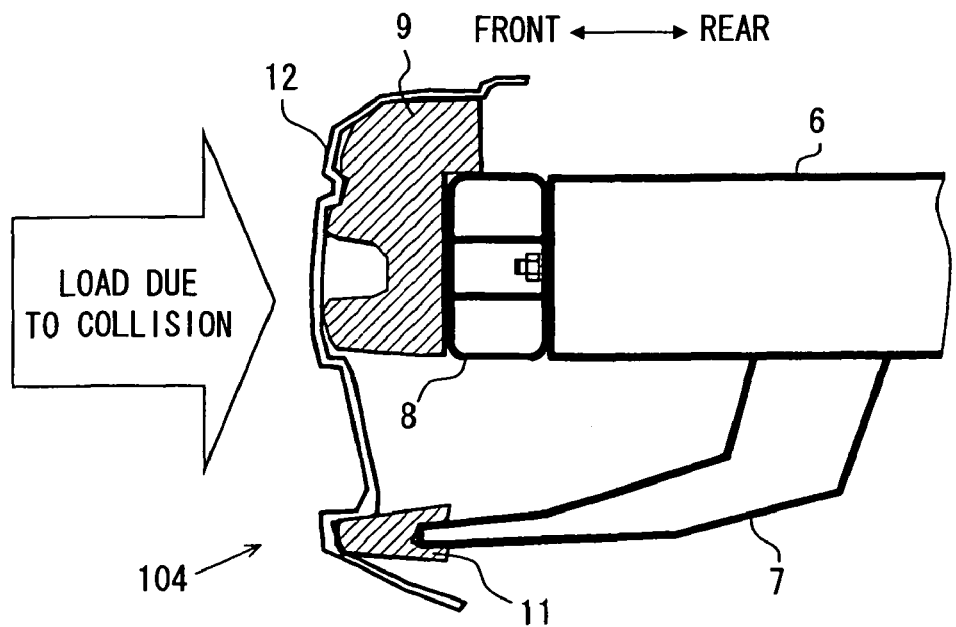
FIG. 6 is a cross-sectional view showing a comparative example 1 of the mounting structure.

Now, the structure of mounting the load sensor 1 in the first embodiment, shown in FIG. 5, is compared with a comparative example 1 shown in FIG. 6, a comparative example 2 shown in FIG. 7 and a comparative example 3 shown in FIG. 8. The comparative example 1 (a bumper is denoted with reference number 104) shows a structure, in which the supporting member 6 is directly connected to the bumper-reinforcing member 8 without installing the load sensor 1. The comparative example 2 (a bumper is denoted with reference number 204) shows a structure, in which the load sensor 1 is positioned between the bumper-reinforcing member 8 and the supporting member 6. The comparative example 3 (a bumper is denoted with reference number 304) shows a structure, in which the load sensor 1 is positioned in an inner space of the bumper-reinforcing member 8.

In the comparative example 1, a total longitudinal length constituted by the bumper 104, the bumper-reinforcing member 8 and the supporting member 6 is the smallest because there is no load sensor 1 is interposed. In the comparative example 2, the total longitudinal length is increased because the load sensor 1 is interposed between the bumper-reinforcing member 8 and the supporting member 6. In this case, an amount of the increase in the total length is the length of the load sensor 1. In the comparative example 3, the load sensor 1 is positioned in the inner space of the bumper-reinforcing member 8. In this case, the total length is increased only by a gap which is necessary for a longitudinal stroke of the load sensor upon collision. In this case, however, a wall of the bumper-reinforcing member 8 has to be cut for inserting the load sensor 1, reducing a mechanical strength of the bumper-reinforcing member 8.

In the structure of the first embodiment, the total length is increased only by the small gap L (e.g., 5 mm), compared with the comparative example 1. Further, there is no such disadvantage that the mechanical strength of the bumper-reinforcing member 8 is sacrificed as in the case of the comparative example 3.

Advantages attained in the first embodiment described above will be summarized below. The load sensor 1 is installed between the bumper-reinforcing member 8 and the supporting member 6 so that it overlaps with the supporting member 6 in the longitudinal direction. Therefore, an increase in the total length of the bumper structure is suppressed to a very small amount L (e.g., 5 mm). Therefore, it is not necessary to make the thickness of the bumper absorber 9 or the bumper-reinforcing member 8 thin for installing the load sensor 1. Further, the load sensor 1 can be installed without changing dimensions of the components constituting the bumper 4.

Figure 9:
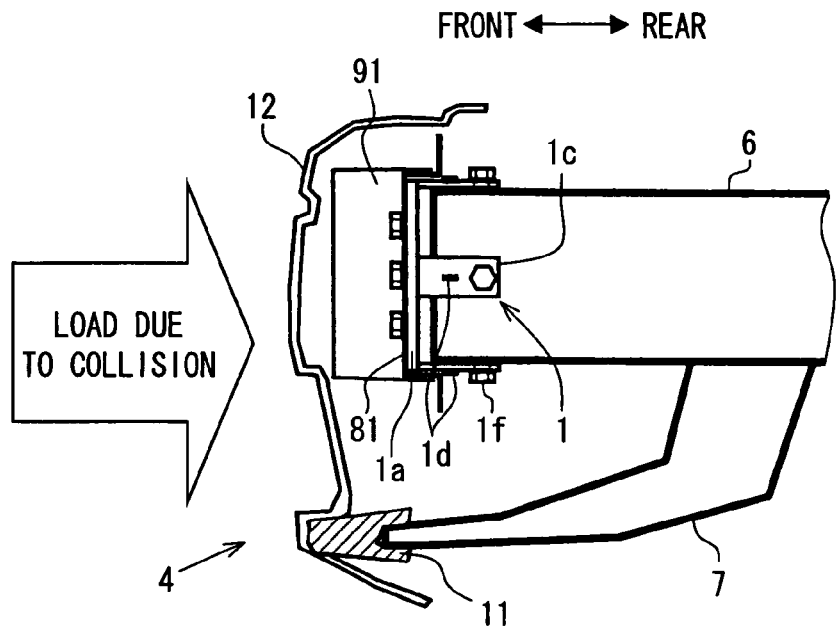
FIG. 9 is a cross-sectional view showing the mounting structure as a modified form of the first embodiment.

In addition, since the mounting plate 1a of the load sensor 1 is connected to the rear surface of the bumper-reinforcing member 8, an impact caused by a collision is surely transferred to the strain gages 1d mounted on the detecting plates 1c connected to the supporting member 6. The rigidity of the bumper structure is not adversely affected by installing the load sensor 1. Further, the load sensor 1 can be easily installed to a single plate 81, serving as a bumper reinforcing member, disposed behind a bumper absorber 91 made of a metal plate, as shown in FIG. 9.

Figure 10:
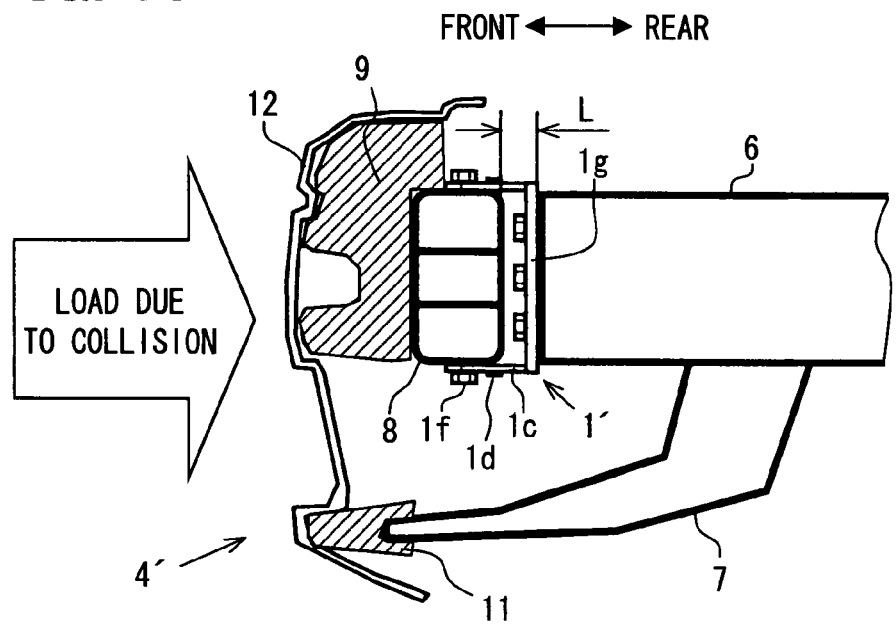
FIG. 10 is a cross-sectional view showing a structure for mounting a load sensor as a second embodiment of the present invention.

A second embodiment of the present invention will be described with reference to FIGS. 10-12B. In this embodiment, detecting plates 1c of a load sensor 1' extending to the front side is connected to upper and lower surfaces of the bumper-reinforcing member 8, as shown in FIG. 10. Other structures and functions are the same as those of the first embodiment. A bumper 4' in this embodiment is similar to the bumper 4 in the first embodiment.

Figure 11:
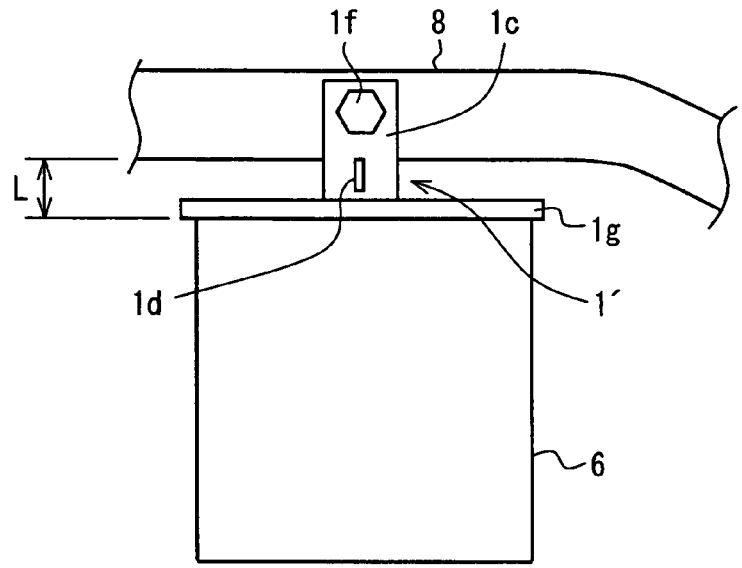
FIG. 11 is a top view showing the mounting structure shown in FIG. 10 in an enlarged scale.
Figure 12A:
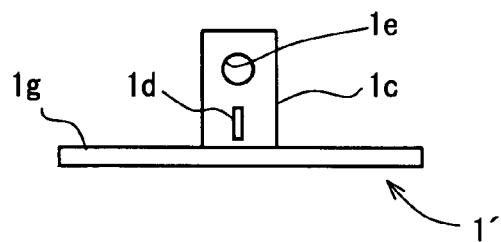
FIG. 12A is a top view showing the load sensor shown in FIG. 11.
Figure 12B:
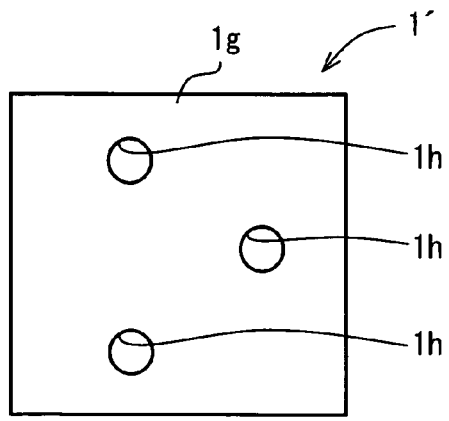
FIG. 12B is a rear view showing the same load sensor shown in FIG. 12A.

As shown in FIGS. 12A and 12B, the load sensor 1' is composed of a mounting plate 1g (a square plate made of a metallic material), two detecting plates 1c extending from the mounting plate 1g to the front side of the vehicle and two strain gages 1d, each mounted on each detecting plate 1c. Three mounting holes 1h are formed in the mounting plate 1g, and the mounting plate 1g is connected to the front surface of the supporting member 6 with three bolts inserted into the mounting holes 1h, as shown in FIG. 10. The detecting plate 1c has a mounting hole 1e, and the detecting plate 1c is connected to the bumper-reinforcing member 8 with a mounting bolt 1f inserted into the mounting hole 1e, as shown in FIG. 11. One detecting plate 1c is connected to the upper wall of the bumper-reinforcing member 8, while the other detecting plate 1c is connected to the lower wall.

A gap L of about 5 mm is provided between the rear end of the bumper-reinforcing member 8 and the front end of the supporting member 6, in the same manner as in the first embodiment. Since the thickness of the mounting plate 1g is about 2 mm, a space of about 3 mm, which is sufficient for a backward stroke of the detecting plate 1c, is secured between the bumper-reinforcing member 8 and the load sensor 1'.

Since the detecting plates 1c are connected to the bumper-reinforcing member 8 in an overlapped manner, an increase in the longitudinal length in the bumper structure by installing the load sensor 1' is minimized as in the first embodiment. An impact caused by a collision is surely transferred to the strain gage 1d mounted on the detecting plate 1c via the bumper-reinforcing member 8. The rigidity of the bumper structure is not adversely affected by installing the load sensor 1'. Further, it is possible to install the load sensor 1' without making major changes in the existing components.

Figure 13A:
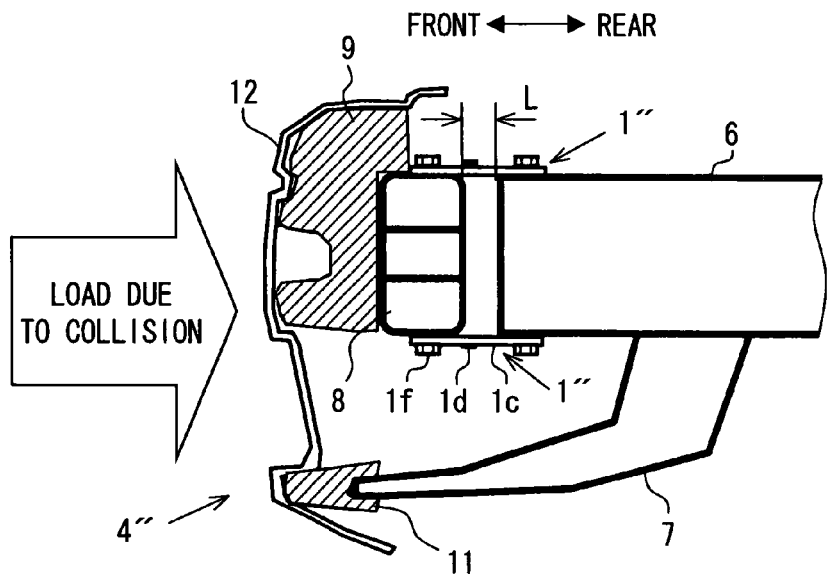
FIG. 13A is a cross-sectional view showing a structure for mounting a load sensor as a third embodiment of the present invention.
Figure 13B:
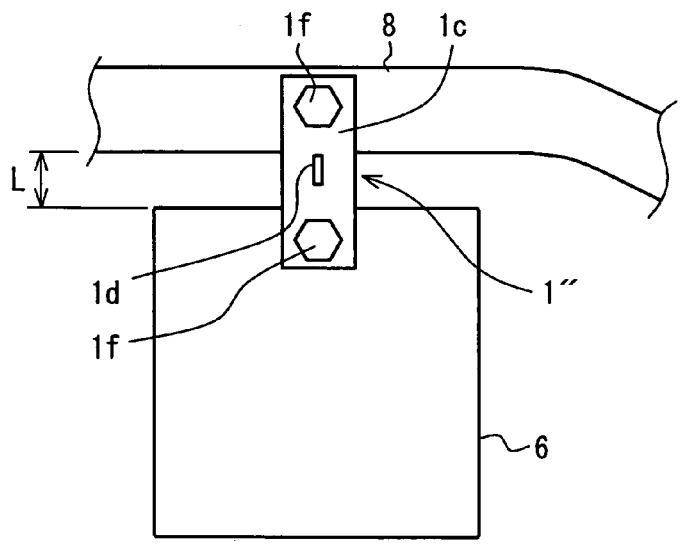
FIG. 13B is a top view showing the mounting structure shown in FIG. 13A in an enlarged scale.

A third embodiment of the present invention will be described with reference to FIGS. 13A-13C. In this embodiment (the bumper is denoted with reference number 4"), a load sensor 1" is composed of only a pair of detecting plates 1c, on each of which a strain gage 1d is mounted. The detecting plate 1c is made of a metallic plate. The detecting plates 1c are connected to the bumper-reinforcing member 8 and the supporting member 6, as shown in FIG. 13A. In other words, the upper and lower walls of the bumper-reinforcing member 8 and the supporting member 6 are connected by the pair of detecting plates 1c. Other structures and functions are the same as those of the foregoing embodiments.

Figure 13C:
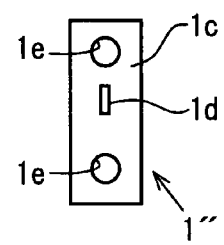
FIG. 13C is a top view showing a detecting plate used in the load sensor shown in FIG. 13B.

As shown in FIG. 13C, the detecting plate 1c, on which the strain gage 1d is mounted, includes a pair of mounting holes 1e. The detecting plate 1c is connected to the bumper-reinforcing member 8 and the supporting member 6 with bolts 1f inserted into the mounting holes 1e, as shown in FIG. 13B. A gap L is provided between the bumper-reinforcing member 8 and the supporting member 6. In this embodiment, however, a size of the gap L is set to about 3 mm which is sufficient for a backward stroke of the detecting plate 1c.

The longitudinal length of the bumper structure is increased only by an amount of the gap L (e., g., 3 mm) in this embodiment. The collision impact is surly transferred to the strain gage 1d mounted on the detecting plate 1c. When the collision impact exceeds a strength of the pair of detecting plates 1c, the bumper-reinforcing member 8 abuts the supporting member 6, and thereby the collision impact is absorbed.

Figure 14A:
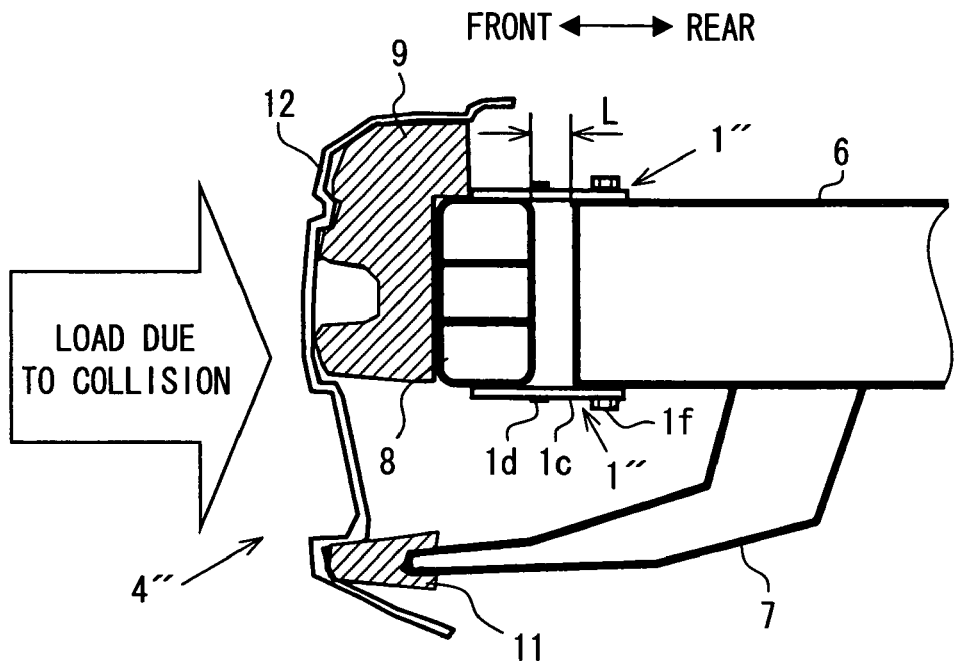
FIG. 14A is a cross-sectional view showing a mounting structure as a modified form of the third embodiment.
Figure 14B:
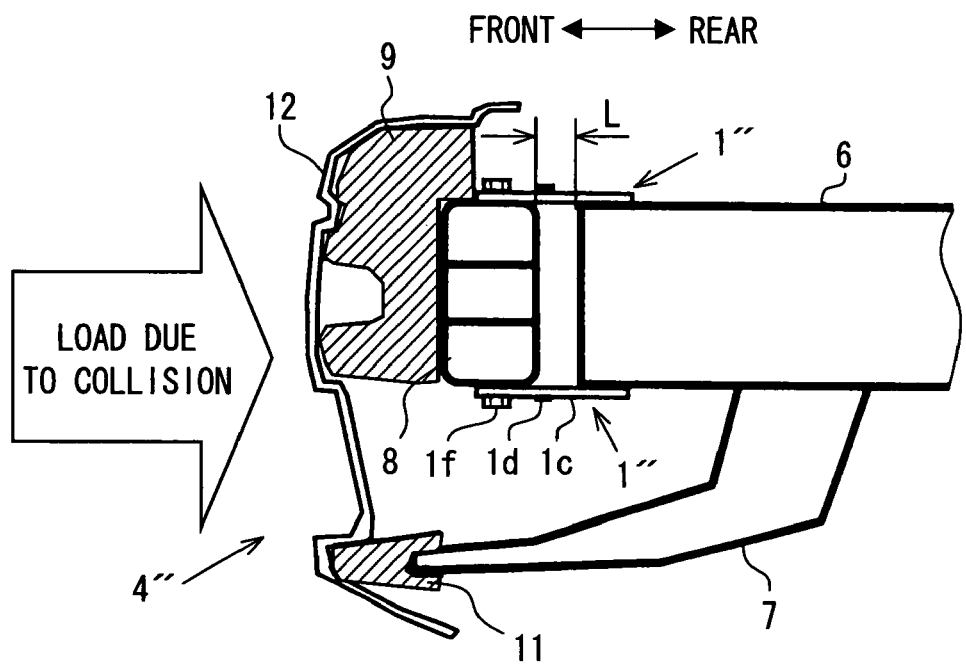
FIG. 14B is a cross-sectional view showing a mounting structure as another modified form of the third embodiment.

The structure for installing the load sensor 1" in the third embodiment may be modified to forms shown in FIG. 14A or 14B. In the modified form shown in FIG. 14A, the detecting plate 1c is integrally formed with the bumper-reinforcing member 8, and only the rear side of the detecting plate 1c is connected to the supporting member 6 with the bolt if. In the modified form shown in FIG. 14B, the detecting plate 1c is integrally formed with the supporting member 6, and only the front side of the detecting plate 1c is connected to the bumper-reinforcing member 8 with the bolt 1f.

The present invention is not limited to the embodiments described above, but it may be variously modified. For example, the number of the detecting plates 1c on which the strain gage 1d is mounted is not limited to four or two. Other numbers of the detecting plates may be used. The sensor detecting the collision impact is not limited to the strain gage. Other types of load sensors may be used. In the case where a crush-box is disposed in front of the supporting member 6, the load sensor may be connected between the bumper-reinforcing member 8 and the crush-box. It may be possible to detect a colliding object based on signals from the load sensors without using the speed sensor. Though four detecting plates are used in the first embodiment, only two detecting plates may be used. Though the load sensor is connected to both of the upper and lower walls of the supporting member 6 in the second and the third embodiments, it is possible to connect it only to one of the walls.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A system for detecting objects colliding with an automotive vehicle, the system comprising:
   a bumper-reinforcing member disposed in a front bumper of an automotive vehicle, the bumper-reinforcing member being elongated in a direction of a width of the vehicle;
   a supporting member, elongated from a front side to a rear side of the vehicle, disposed behind the bumper-reinforcing member;
   a load sensor for detecting a load imposed on the front bumper by a collision of an object with the vehicle, the load sensor being connected to the bumper-reinforcing member and the supporting member; and
   an electronic controller for detecting kinds of objects colliding with the vehicle based on signals from the load sensor, wherein:
   the load sensor includes a detecting plate extending in a front-rear direction of the automotive vehicle;
   the load sensor is configured to detect a strain of the detecting plate;
   one end of the detecting plate is connected to one of upper, lower, left and right walls of the supporting member; and
   an open gap is defined between the bumper-reinforcing member and the supporting member, the detecting plate extending across the open gap.

2. The system as in claim 1, wherein:
   the load sensor is connected to a rear wall of the bumper-reinforcing member.

3. The system as in claim 1, wherein:
   the load sensor is connected to an upper wall or a lower wall of the bumper-reinforcing member.

4. A system for detecting objects colliding with an automotive vehicle, the system comprising:
   a bumper-reinforcing member disposed in a front bumper of an automotive vehicle, the bumper-reinforcing member being elongated in a direction of a width of the vehicle;
   a supporting member, elongated from a front side to a rear side of the vehicle, disposed behind the bumper-reinforcing member;
   a load sensor for detecting a load imposed on the front bumper by a collision of an object with the vehicle, the load sensor being connected to the bumper-reinforcing member and the supporting member; and an electronic controller for detecting kinds of objects colliding with the vehicle based on signals from the load sensor, wherein:
the load sensor includes a detecting plate extending in a front-rear direction of the automotive vehicle;
the load sensor is configured to detect a strain of the detecting plate;
one end of the detecting plate is connected to one of upper, lower, left and right walls of the supporting member;
the one end of the detecting plate is connected directly to the one of the walls of the supporting member.

5. The system as in claim 4, wherein:
the load sensor is connected to a front wall of the supporting member.

6. A system for detecting objects colliding with an automotive vehicle, the system comprising:
a bumper-reinforcing member disposed in a front bumper of an automotive vehicle, the bumper-reinforcing member being elongated in a direction of a width of the vehicle;
a supporting member, elongated from a front side to a rear side of the vehicle, disposed behind the bumper-reinforcing member;
a load sensor for detecting a load imposed on the bumper by a collision of an object with the vehicle, the load sensor being connected to the bumper-reinforcing member and the supporting member; and
an electronic controller for detecting kinds of objects colliding with the vehicle based on signals from the load sensor, wherein:
the load sensor includes a mounting plate, a plurality of detecting plates extending from the mounting plate to a rear side of the vehicle, a plurality of strain gages each mounted on each detecting plate;
the mounting plate is connected to a rear wall of the bumper-reinforcing member; and
at least one of the plurality of detecting plates is connected to one of upper, lower, left and right walls of the supporting member, respectively, so that a gap is formed between the bumper-reinforcing member and the supporting member.

7. The system as in claim 1, the system further comprising a strain gage mounted on the detecting plate.

8. The system as in claim 1, wherein the load sensor includes a mounting plate attached to a rear wall of the bumper-reinforcing member, the detecting plate extending from the support member to the mounting plate.

9. The system as in claim 8, the system further comprising a strain gage mounted on the detecting plate.

10. The system as in claim 4, the system further comprising a strain gage mounted on the detecting plate.

11. The system as in claim 4, wherein the load sensor includes a mounting plate attached to a rear wall of the bumper-reinforcing member, the detecting plate extending from the support member to the mounting plate.

12. The system as in claim 11, the system further comprising a strain gage mounted on the detecting plate.

* * * * *